United States Patent
LeCrone

(10) Patent No.: US 11,500,740 B2
(45) Date of Patent: Nov. 15, 2022

(54) CONTINUOUS DATA PROTECTION

(71) Applicant: EMC IP Holding Company LLC, Hopkinton, MA (US)

(72) Inventor: Douglas E. LeCrone, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 230 days.

(21) Appl. No.: 16/692,187

(22) Filed: Nov. 22, 2019

(65) Prior Publication Data

US 2021/0157681 A1 May 27, 2021

(51) Int. Cl.
| | |
|---|---|
| *G06F 11/00* | (2006.01) |
| *G06F 11/14* | (2006.01) |
| *G06F 16/11* | (2019.01) |
| *G06F 11/20* | (2006.01) |
| *G06F 11/30* | (2006.01) |
| *G06F 16/17* | (2019.01) |
| *G06F 16/182* | (2019.01) |

(Continued)

(52) U.S. Cl.
CPC ...... *G06F 11/1469* (2013.01); *G06F 11/0757* (2013.01); *G06F 11/1435* (2013.01); *G06F 11/1451* (2013.01); *G06F 11/1461* (2013.01); *G06F 11/1464* (2013.01); *G06F 11/2056* (2013.01); *G06F 11/3034* (2013.01); *G06F 16/119* (2019.01); *G06F 16/172* (2019.01); *G06F 16/1734* (2019.01); *G06F 16/1844* (2019.01)

(58) Field of Classification Search
CPC ............ G06F 11/1469; G06F 11/2097; G06F 11/1471; G06F 11/1451; G06F 11/1407; G06F 16/2365; G06F 2201/82; G06F 11/07; G06F 11/1446; G06F 11/1453; G06F 11/2056
See application file for complete search history.

(56) References Cited

U.S. PATENT DOCUMENTS

| | | | | |
|---|---|---|---|---|
| 5,530,855 A | * | 6/1996 | Satoh | G06F 11/2064 707/648 |
| 6,697,960 B1 | * | 2/2004 | Clark | G06F 11/1469 714/15 |

(Continued)

*Primary Examiner* — Loan L.T. Truong
(74) *Attorney, Agent, or Firm* — Muirhead and Saturnelli, LLC

(57) ABSTRACT

Providing continuous data protection includes maintaining a database having substantially all data modifications made to a primary volume over a recovery interval. The database is maintained in conjunction with a copying operation where the data of the primary volume are mirrored to a remote volume to permit recovery of mirrored data in the event of loss of primary volume data. The contents of the remote volume generally lag behind the contents of the primary volume by substantially the recovery interval. Providing continuous data protection also includes providing data roll-back to a precise point in time within the recovery interval by applying, to the contents of the remote volume, all data modifications in the database that occurred between the latest data modification to the remote volume and the precise point in time within the recovery interval. A time stamp mechanism of sufficient precision and granularity may be used.

20 Claims, 6 Drawing Sheets

(51) Int. Cl.
   *G06F 16/172*    (2019.01)
   *G06F 11/07*    (2006.01)

(56) References Cited

U.S. PATENT DOCUMENTS

| | | | | |
|---|---|---|---|---|
| 6,983,295 B1* | 1/2006 | Hart | ............ | G06F 11/1469 707/610 |
| 7,263,537 B1* | 8/2007 | Lin | ............ | G06F 16/2308 707/639 |
| 7,761,421 B2* | 7/2010 | Frolund | ............ | G06F 11/182 707/637 |
| 8,667,033 B1* | 3/2014 | McCline | ............ | G06F 16/22 707/826 |
| 9,069,782 B2* | 6/2015 | Yang | ............ | G06F 16/13 |
| 9,424,142 B2* | 8/2016 | Ljubuncic | ............ | G06F 11/1438 |
| 9,639,439 B2* | 5/2017 | Laicher | ............ | H04L 67/1095 |
| 9,804,935 B1* | 10/2017 | Holenstein | ............ | G06F 11/1469 |
| 9,830,223 B1* | 11/2017 | Holenstein | ............ | G06F 11/1474 |
| 10,423,493 B1* | 9/2019 | Vig | ............ | G06F 11/3055 |
| 11,048,590 B1* | 6/2021 | Sapuntzakis | ............ | G06F 11/1448 |
| 11,144,407 B1* | 10/2021 | Shankar | ............ | G06F 11/1469 |
| 2006/0235909 A1* | 10/2006 | Oks | ............ | G06F 11/1461 |
| 2008/0201602 A1* | 8/2008 | Agarwal | ............ | G06F 11/2097 714/4.1 |
| 2009/0109823 A1* | 4/2009 | Joukov | ............ | G06F 11/1456 369/85 |
| 2010/0280999 A1* | 11/2010 | Atluri | ............ | G06F 11/1471 707/657 |
| 2011/0225141 A1* | 9/2011 | Chaudhry | ............ | G06F 16/172 707/827 |
| 2012/0109895 A1* | 5/2012 | Zwilling | ............ | G06F 11/1471 707/648 |
| 2012/0117421 A1* | 5/2012 | Craft | ............ | G06F 11/1469 714/15 |
| 2014/0244949 A1* | 8/2014 | Abali | ............ | G06F 3/065 711/162 |
| 2015/0026437 A1* | 1/2015 | Achenbach | ............ | G06F 9/384 712/216 |
| 2015/0046744 A1* | 2/2015 | Frerking | ............ | G06F 11/3055 714/4.11 |
| 2016/0342484 A1* | 11/2016 | French | ............ | G06F 11/1471 |
| 2017/0220464 A1* | 8/2017 | Gallagher | ............ | G06F 21/6209 |
| 2017/0300387 A1* | 10/2017 | Durairaj | ............ | G06F 11/1466 |
| 2018/0074909 A1* | 3/2018 | Bishop | ............ | G06F 11/2097 |
| 2018/0137016 A1* | 5/2018 | Brown | ............ | G06F 11/1448 |
| 2018/0210793 A1* | 7/2018 | Mamluk | ............ | G06F 11/2094 |
| 2019/0278482 A1* | 9/2019 | Dubeyko | ............ | G06F 3/0659 |
| 2019/0339894 A1* | 11/2019 | Bensberg | ............ | G06F 3/0604 |
| 2019/0392001 A1* | 12/2019 | Carothers | ............ | H04L 67/2842 |
| 2020/0034251 A1* | 1/2020 | Antonopoulos | ............ | G06F 11/1474 |
| 2020/0110546 A1* | 4/2020 | Natanzon | ............ | G06F 11/1448 |
| 2020/0183794 A1* | 6/2020 | Dwarampudi | ............ | G06F 11/3006 |
| 2020/0401603 A1* | 12/2020 | Driesch, Jr. | ............ | G06F 16/2365 |
| 2021/0034605 A1* | 2/2021 | Cai | ............ | G06F 16/2379 |
| 2022/0108033 A1* | 4/2022 | Algie | ............ | H04L 9/0894 |

* cited by examiner

CONTINUOUS DATA PROTECTION

TECHNICAL FIELD

This application relates to the field of computer systems and storage systems therefor and, more particularly, to the field of copying data accessed by storage systems.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to any one of the actual disk drives. Allowing multiple host systems to access the single storage system allows the host systems to share data stored therein.

In the operation of data processing systems, it is sometimes useful to restore data that has been lost or damaged, and thus it is a common feature of data storage systems to provide services and resources for backing up and restoring data. In a conventional backup technique, storage devices such as disk drives that are used in the execution of application programs are periodically backed up to backup devices, such as other disk drives or magnetic tape. Production devices or volumes are referred to herein as primary devices/volumes, and backup devices/volumes as secondary (remote) devices or volumes. One common backup approach is to perform a full backup of an entire primary volume at some relatively long interval (such as one week or one month) and an incremental backup at shorter intervals (such as daily), where the incremental backup only contains the data that has changed since the last full backup. Then, in the event of data loss, the data from the secondary (remote) device can be copied back to either the original or a replacement primary device, starting with the full backup copy and finishing with the incremental backup copy from the desired point in time to which the primary device is to be restored. Conventional backup techniques such as these may be effective in a disaster recovery scenario, in which it is desired to restore production volumes to their state at the time of occurrence of the disaster, as well as in the case of hardware or software malfunctions that cause data corruption, in which it may be desired to restore production volumes to some earlier time before the malfunction occurred and then re-start system operation.

One drawback of the conventional backup technique is the relative coarseness of the backup interval. The primary device can only be restored to points in time spaced apart by the incremental backup interval. When this interval is one day, for example, it is possible to lose an entire day's worth of data that was created after the most recent incremental backup. Such exposure to data loss is unacceptable in many data processing applications, such as on-line transaction processing for example.

In more sophisticated modern storage systems, mirroring is used in which data from a primary device is transferred to a remote device in a more continuous manner. Remote copying is a technique where, as data modifications (writes) are made to a primary volume, the modifications are transferred to a remote storage system where they are also made to a corresponding remote volume. In the event of data loss at the primary system, data can be copied from the remote volume to the original or a replacement primary volume in a recovery operation. Such mirroring techniques are generally for protection against disaster scenarios, in which the up-to-date remote volume can be used to restore the primary volume to its most recent state.

One well-known implementation of remote copying is called Extended Remote Copy or XRC, available from IBM Corporation. In XRC, as a host application issues a write I/O request to a primary XRC volume, the XRC function captures information such as the write address and data that are required by a system data mover (SDM) to create the write I/O operation on a remote volume in a separate remote storage system. Asynchronous to the application I/O request, the SDM communicates with the primary storage system and collects information for recent writes (also referred to as "updates"), then journalizes the updates into consistency groups that are written to the remote volume. A consistency group contains records that have an order of update preserved across multiple logical control units within a storage system, and across multiple storage systems participating in the same XRC session. Consistency groups enable writes to the remote storage system to be done in the proper order, maintaining I/O consistency to a specific point in time.

While mirroring techniques can provide for full recovery in a disaster situation, they do not provide protection against data corruption such as can be caused by hardware or software malfunctions. As the remote volume is updated along with the primary volume, previous states of both the primary and remote volumes are lost, and thus it is not possible to restore the primary volume to any earlier point in time, such as to a time prior to a data-corrupting malfunction. Although conventional backups can be utilized for such restoration to earlier points in time, effectiveness is limited due to the relatively coarse granularity.

Accordingly, it is desirable to provide a mechanism that allows for recovering past versions of data at a precise point in time.

SUMMARY OF THE INVENTION

According to the system described herein, providing continuous data protection in a data storage system includes maintaining a database including substantially all data modifications made to a primary volume over a recovery interval, the database being maintained in conjunction with a copying operation by which the data of the primary volume are mirrored to a remote volume to permit recovery of mirrored data in the event of loss of primary volume data, the contents of the remote volume generally lagging behind the contents of the primary volume by substantially the recovery interval and includes providing data roll-back to a precise point in time within the recovery interval by applying, to the contents of the remote volume, all data modifications in the database that occurred between the latest data modification to the remote volume and the precise point in time within the recovery interval. The data modifications in the database may include a time stamp mechanism of sufficient precision and granularity to cause dependent writes to maintain a proper order. The data modifications made to the primary volume may be transferred to the database upon being written to a cache at a primary storage location containing the primary volume. The copying operation may be a remote copying operation. The data of the primary volume may be asynchronously mirrored to the remote volume located at a remote storage location. The recovery time may be an amount of time needed to transfer all the data modifications in the database corresponding to the remote volume to create up-to-date remote storage volumes. The recovery interval may be no more than a predetermined maximum recovery time. The maximum recovery time may be one hour. Providing continuous data protection in a data storage system may also include performing a complete recovery of the primary volume by transferring all the data modifications in the database to the remote volume location to create an up-to-date remote volume and copying the data from the up-to-date remote storage volume to the primary volume. The copying operation may be part of operation of a logical data migration facility operating within a host computer coupled to the primary and remote volumes, and the data modifications may be copied from the host computer to the remote volume.

According further to the system described herein, data storage system providing continuous data protection includes a primary storage system at a primary storage location, the primary storage system including a primary volume receiving data modifications from a primary host computer system, a remote storage system at a remote storage location, the remote storage system including a remote volume, and a continuous data protection system that maintains a database including substantially all the data modifications made to the primary volume over a recovery interval. The database is maintained in conjunction with a remote copying operation by which the data of the primary volume are asynchronously mirrored to the remote volume to permit recovery of mirrored data in the event of loss of primary volume data, the contents of the remote volume generally lagging behind the contents of the primary volume by substantially the recovery interval and that provides data roll-back to a precise point in time within the recovery interval by applying, to the contents of the remote volume, all data modifications in the database that occurred between the latest data modification to the remote volume and the precise point in time within the recovery interval. The data modifications in the database may include a time stamp mechanism of sufficient precision and granularity to cause dependent writes to maintain a proper order. The primary storage system may include a cache operative to receive and temporarily store the data modifications from the primary host computer system before the data modifications are written to the primary volume. The data modifications may be transferred from the cache to the database upon being written to the cache. The continuous data protection system may be located in a remote storage system. The continuous data protection system may be located in a primary host computer system at the primary storage location, the primary host computer system including an application program that utilizes the storage resources provided by the primary volume. The primary host computer system may be partitioned into at least two logical partitions (LPARs), one LPAR containing the continuous data protection system and the other LPAR containing the application program. The continuous data protection system may be further operative to perform a complete recovery of the primary volume by transferring all the data modifications in the database to the remote volume location to create an up-to-date remote volume and by copying the data from the up-to-date remote storage volume to the primary volume.

According further to the system described herein, a computer program product includes a computer-readable medium having computer instructions stored thereon, the computer instructions being operative when executed by a computer system to cause the computer system to execute a continuous data protection system to provide continuous data protection in a data storage system having a primary storage system and remote storage system. The continuous data protection system includes the operations of maintaining a database including substantially all the data modifications made to the primary volume over a recovery interval, the database being maintained in conjunction with a remote copying operation by which the data of the primary volume are asynchronously mirrored to the remote volume to permit recovery of mirrored data in the event of loss of primary volume data, the contents of the remote volume generally lagging behind the contents of the primary volume by substantially the recovery interval and providing data roll-back to a precise point in time within the recovery interval by applying, to the contents of the remote volume, all data modifications in the database that occurred between the latest data modification to the remote volume and the precise point in time within the recovery interval. The data modifications in the database may include a time stamp mechanism of sufficient precision and granularity to cause dependent writes to maintain a proper order. The data modifications made to the primary volume may be transferred to the database upon being written to a cache at the primary storage location. The continuous data protection system may further include the operation of performing a complete recovery of the primary volume by transferring all the data modifications in the database to the remote volume location to create an up-to-date remote volume and copying the data from the up-to-date remote storage volume to the primary volume. The recovery interval may be an amount of time needed to transfer all the data modifications in the database corresponding to the remote volume to create up-to-date remote storage volumes.

The system described herein includes a copying technique that provides, in addition to conventional up-to-the-minute recovery ability of mirrored systems, the ability to restore a primary volume to an arbitrary point in time within a recent recovery interval. The technique thus allows for much more flexible recovery of a system state which can be useful in various error/loss scenarios beyond disaster recovery scenarios. As the technique can permit recovery as finely as to within a single write transaction, it is referred to herein as continuous data protection. The technique is disclosed primarily in a remote-copying context, but it will be appreciated that the technique may also be used to enhance local data copying techniques such as LDMF, for example.

BRIEF DESCRIPTION OF THE DRAWINGS

Embodiments of the system are described with reference to the several figures of the drawings, noted as follows.

DETAILED DESCRIPTION OF VARIOUS EMBODIMENTS

In the system described herein, a write database is maintained that includes substantially all data modifications (writes) made to a primary volume over a recovery interval. The write database is maintained in conjunction with a copying operation by which the data of the primary volume are mirrored to a remote volume, such as in XRC-style remote copying for example. The contents of the remote volume generally lag behind the contents of the primary volume by as much as substantially the recovery interval. That is, the write database serves as a buffer to hold modifications made over the recovery interval, and the remote volume is updated from the write database. The remote volume may be updated from the write database periodically to keep the remote volume desirably close (in time and contents) to the primary volume. It may also be desirable to maintain some number of updates in the write database even after being applied to the remote volume, such that the remote volume may be rolled back to an earlier point in time if it becomes necessary or desirable.

The mechanism disclosed herein provides data roll-back of the primary volume to a precise point in time within the recovery interval. In one embodiment, roll-back is performed by applying, to the contents of the remote volume, all data modifications in the write database that occurred between the latest data modification to the remote volume and the precise point in time within the recovery interval. This operation may be performed by first copying the contents of the remote volume to the original or a replacement primary volume, for example, and then performing all of the desired data modifications to the primary volume in sequence from the write database. Alternatively, roll-back of the primary volume may be accomplished by undoing a set of the most recent writes that are stored in the database. The technique also permits selective roll-forward of the remote volume to maintain desired currency with the primary volume, as well as selective roll-back as part of restoring the system to an earlier point in time.

Figure 1:
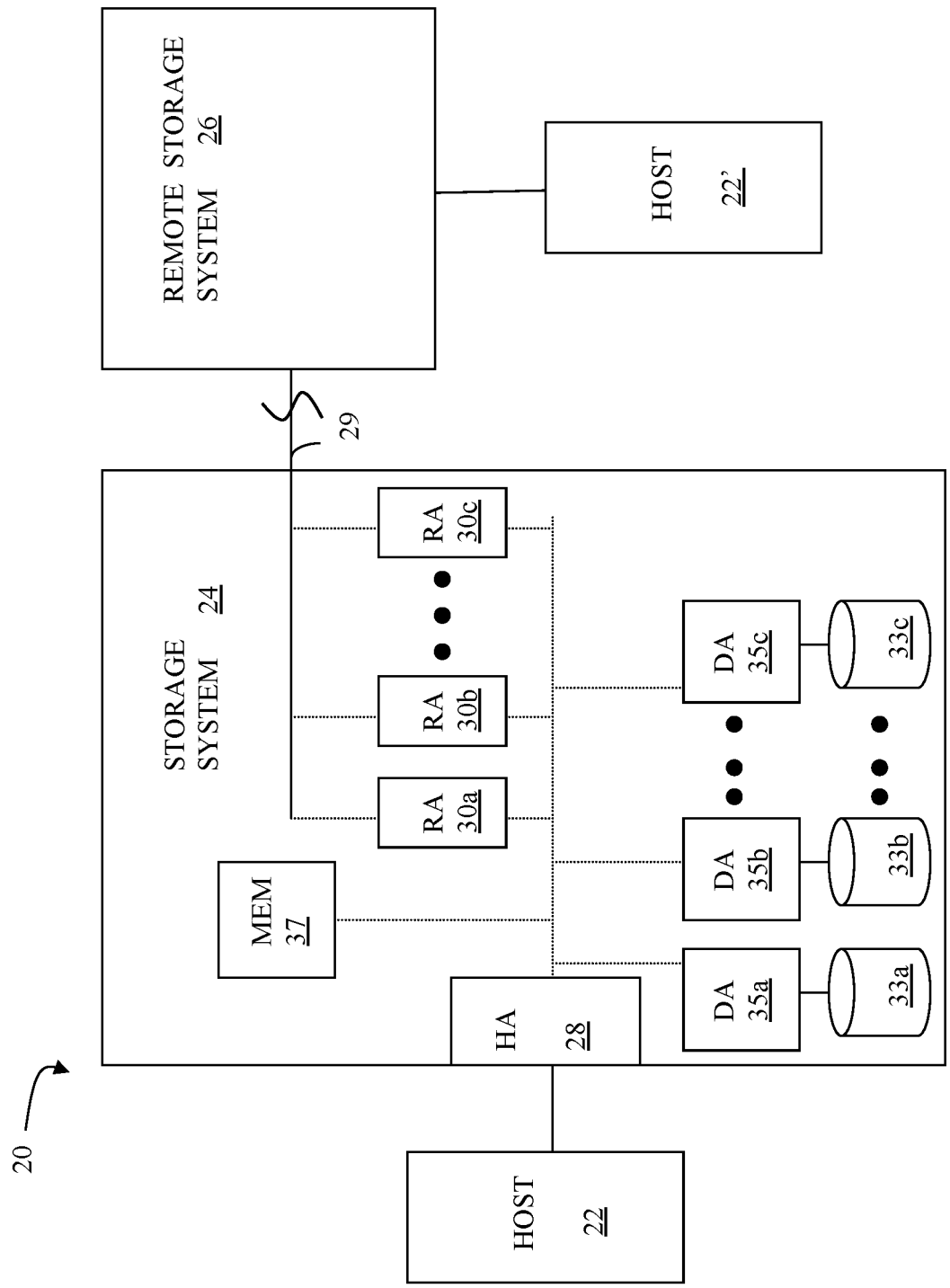
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter), which facilitates an interface between the host 22 and the storage system 24. Although the diagram 20 shows the host 22 and the HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units (including disks, solid state storage devices, etc.), each containing a different portion of data stored on the storage system 24. FIG. 1 shows the storage system 24 having a plurality of physical storage units 33a-33c. The storage system 24 (and/or remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28 and the RA's 30a-30c of the storage system 24. Note that, in other embodiments, it is possible for more than one physical storage unit to be serviced by a DA and that it is possible for more than one DA to service a physical storage unit. The storage system 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, another host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
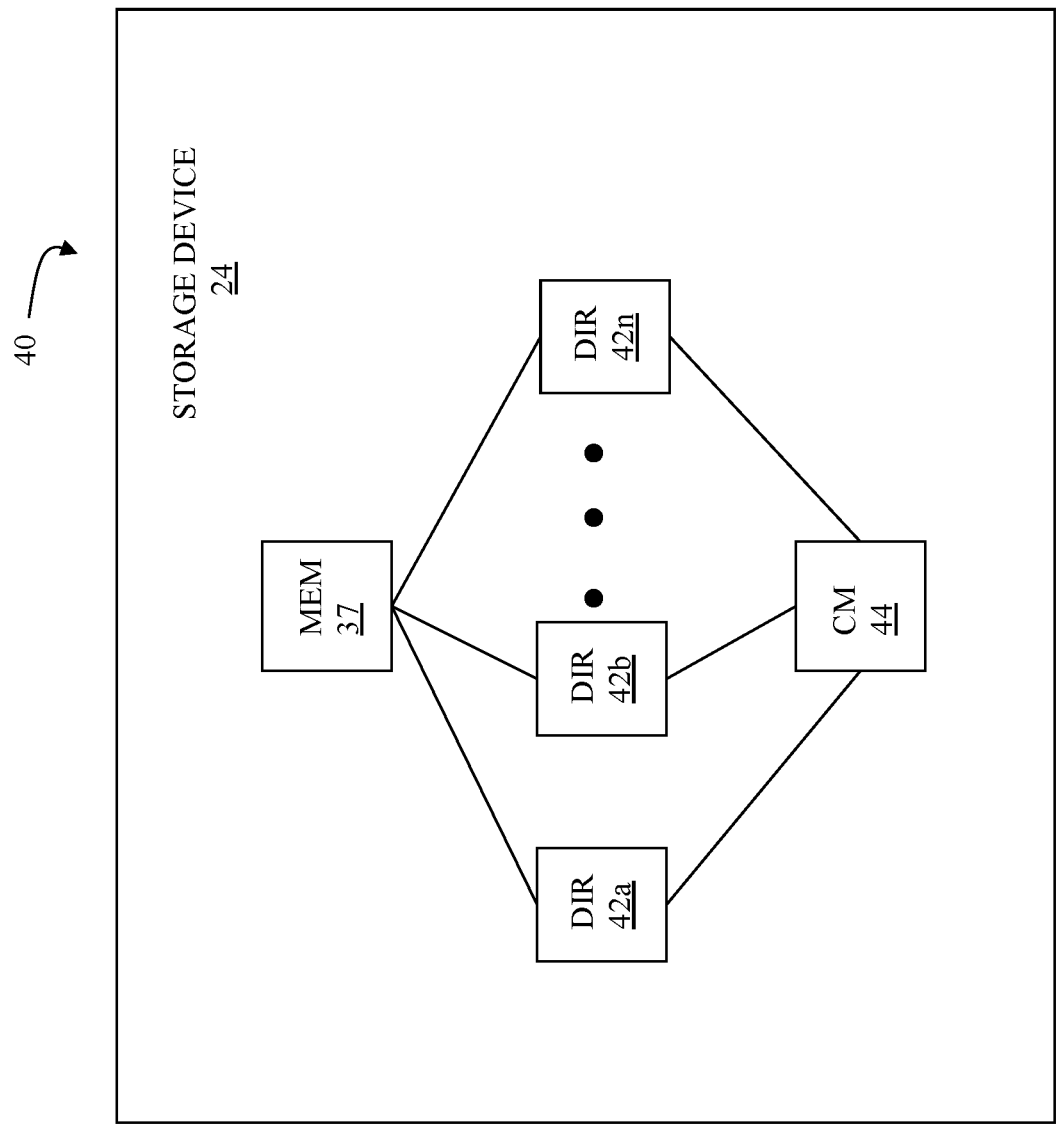
FIG. 2 is a schematic diagram illustrating an embodiment of a storage system where each of a plurality of directors are coupled to the memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
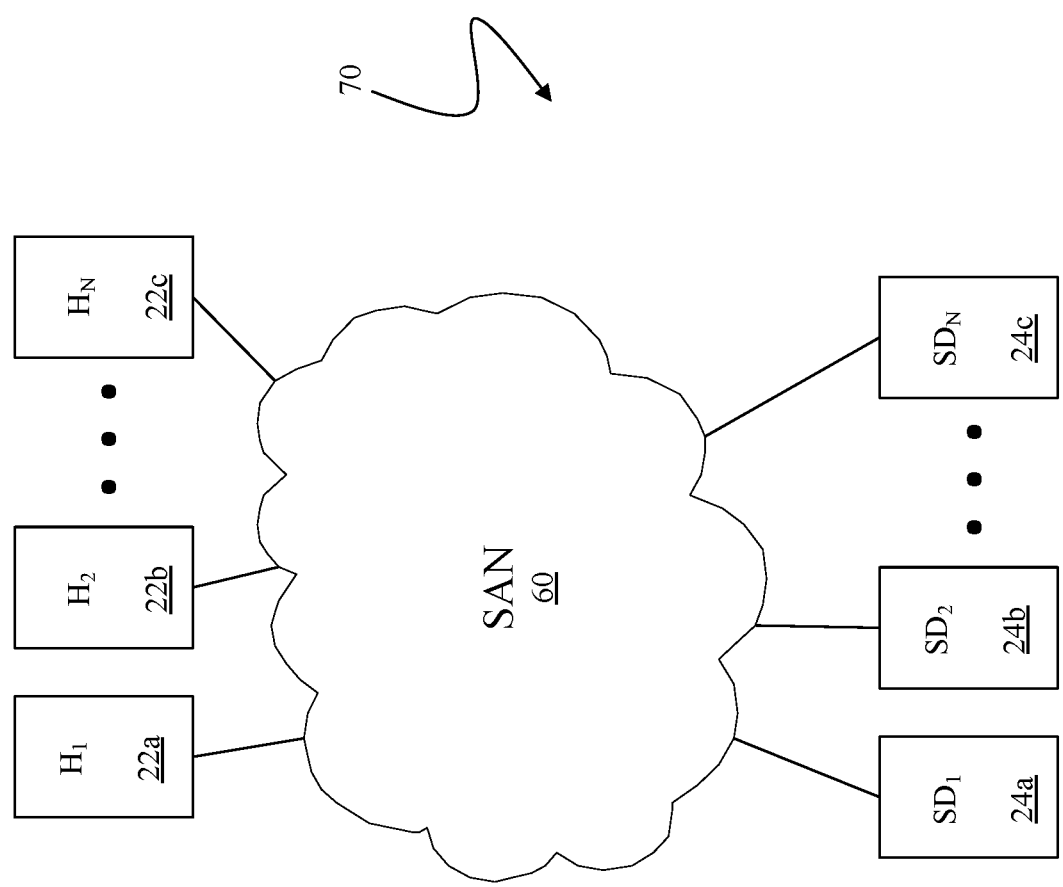
FIG. 3 is a schematic illustration showing a storage area network (SAN) providing a SAN fabric coupling a plurality of host systems to a plurality of storage systems that may be used in connection with an embodiment of the system described herein.

FIG. 3 is a schematic illustration 70 showing a storage area network (SAN) 60 providing a SAN fabric coupling a plurality of host systems ($H_1$-$H_N$) 22a-c to a plurality of storage systems ($SD_1$-$SD_N$) 24a-c that may be used in connection with an embodiment of the system described herein. Each of the devices 22a-c, 24a-c may have a corresponding port that is physically coupled to switches of the SAN fabric used to implement the storage area network 60. The switches may be separately programmed by one of the devices 22a-c, 24a-c or by a different device (not shown). Programming the switches may include setting up specific zones that describe allowable data-path connections (which ports may form a data-path connection) and possible allowable initiator ports of those configurations. For example, there may be a zone for connecting the port of the host 22a with the port of the storage system 24a. Upon becoming activated (e.g., powering up), the host 22a and the storage system 24a may send appropriate signals to the switch(es) of the storage area network 60, and each other, which then allows the host 22a to initiate a data-path connection between the port of the host 22a and the port of the storage system 24a. Zones may be defined in terms of a unique identifier associated with each of the ports, such as such as a world-wide port name (WWPN).

In various embodiments, the system described herein may be used in connection with performance data collection for data migration and/or data mirroring techniques using a SAN. Data transfer among storage systems, including transfers for data migration and/or mirroring functions, may involve various data synchronization processing and techniques to provide reliable protection copies of data among a source site and a destination site. In synchronous transfers, data may be transmitted to a remote site and an acknowledgement of a successful write is transmitted synchronously with the completion thereof. In asynchronous transfers, a data transfer process may be initiated and a data write may be acknowledged before the data is actually transferred to directors at the remote site. Asynchronous transfers may occur in connection with sites located geographically distant from each other. Asynchronous distances may be distances in which asynchronous transfers are used because synchronous transfers would take more time than is preferable or desired. Examples of data migration and mirroring products includes Symmetrix Remote Data Facility (SRDF) products from EMC Corporation.

Figure 4:
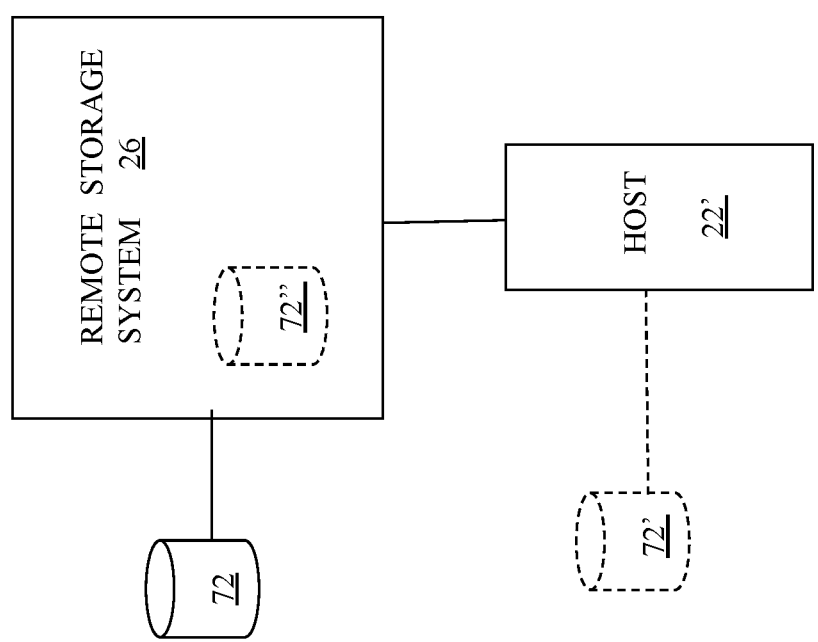
FIG. 4 is a schematic illustration showing a host, a remote storage system, and a write database according to an embodiment of the system described herein.

Referring to FIG. 4, the remote storage system 26 is shown in more detail as including a write database 72 that is used in connection with providing continuous data protection functionality as described herein. The write database 72 may be coupled to the remote storage system 26. It is also possible to implement a write database 72' that is separate from, but coupled to, the host 22'. A write database 72" may also be implemented as a logical device that uses non-volatile storage of the remote storage system 26. Different implementations are described in more detail elsewhere herein. The write database 72 may be relatively large. There are trade-offs regarding the size of the write database 72. Generally, a larger implementation of the write database 72 provides for a longer recovery interval over which a precise point-in-time recovery is possible. However, in the event of a disaster or other event that requires data recovery operations, a larger implementation of the write database 72 may require more time to be transferred to the storage system 26. There may be a target maximum recovery time (e.g., sixty minutes), which may vary from system to system and depending upon user needs. In some embodiments, storage efficiency may be increased by using data deduplication and compression. Of course, in the case of data deduplication, it may be necessary to separate any time stamp associated with data from the data itself since it is otherwise unlikely that two identical data elements would have the same time stamp.

Figure 5:
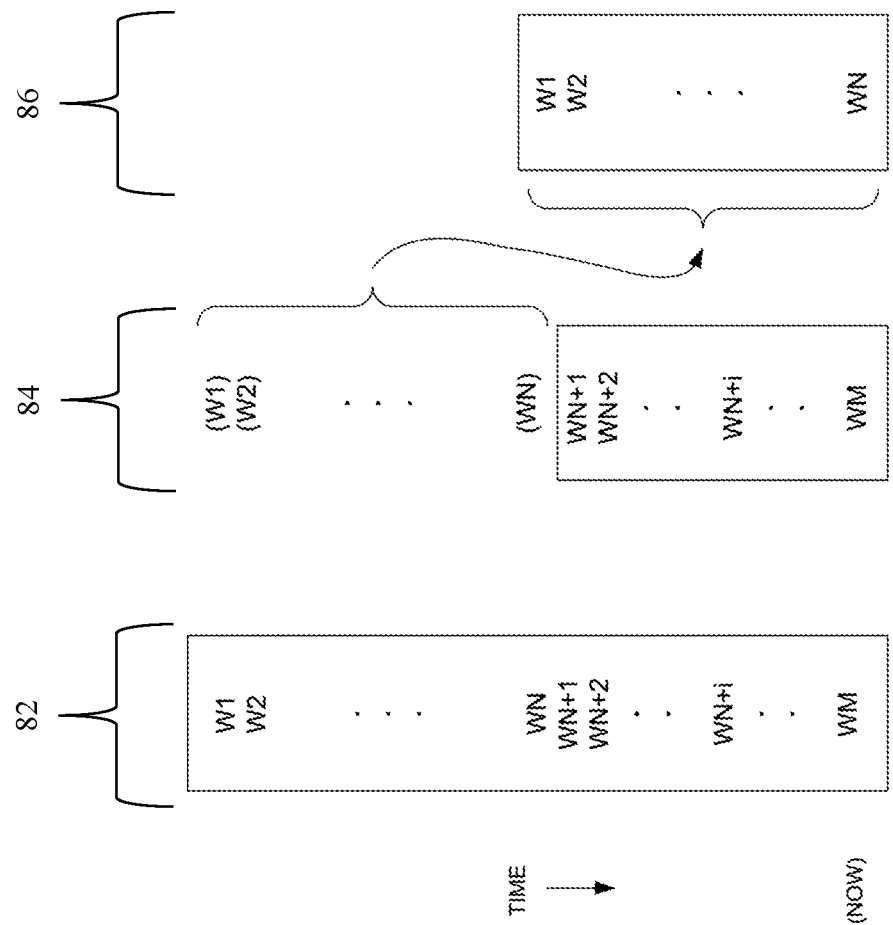
FIG. 5 is a schematic illustration showing contents of a primary volume, a remote volume, and a write database at a point in time according to an embodiment of the system described herein.

FIG. 5 illustrates the operation of the system of FIG. 4. A leftmost column 82 reflects a series of writes to the storage system 24 by the primary host 22. The writes are labeled W1, W2, . . . as shown. FIG. 5 illustrates a particular moment in time (labeled "NOW") at which all writes up to write WM have occurred at the storage system 24. Thus, at the time NOW, the data contents of the storage system 24 reflect the occurrence of all the writes W1, W2, . . . , WM in the order shown from top to bottom. In an embodiment herein, the system may use precision time protocol (PTP), which is specified in IEEE 1588-2002, to time stamp and properly order the writes. Of course other time protocols having sufficient precision and granularity could be used instead of PTP. Using PTP (or a similar protocol) causes writes from the host 22 to the storage system 24 to be time stamped so that a proper order may be maintained after the writes are transferred from the storage system 24 to the remote storage system 26. That is, using a time stamp mechanism of sufficient precision and granularity results in dependent writes from the host 22 to maintain a proper order. Thus, for example, if write consistency requires that W2 follow W1, then W2 will always follow W1 when using a time stamp mechanism of sufficient precision and granularity. Moreover, dependent writes from different hosts may also maintain proper ordering when using a time stamp mechanism of sufficient precision and granularity. A timing mechanism such as PTP (or similar) allows the different hosts to access the same time scale in a way that prevents improper ordering of dependent writes.

A middle column 84 shows contents of the write database 72, which stores the writes W1, W2, . . . WM as unexecuted transactions. That is, each write transaction (which includes written data as well as an address of the data to be written) is stored so that the write can be performed (played) when desired to either update the remote storage system 26 or in connection with recovery to a prior operating state. It is assumed that the write database 72 has sufficient storage for only M writes, and thus the write database 72 at the time NOW includes writes WN+1, WN+2, . . . , WM. At an earlier time than NOW, previous writes W1, W2, . . . , WN populated the write database 72, but, as indicated by parentheses, the previous writes have since been displaced by more recent writes in the series WN+1, WN+2, . . . , WM.

A rightmost column 86 shows that the data contents of the remote storage system 26 reflect writes W1, W2, . . . , WN which have been transferred from the write database 72 to the remote storage system 26 to be performed on the remote storage system 26. Thus, it will be seen that the contents of the remote storage system 26 generally lag behind those of the storage system 24 by as much as the number of writes M that can be stored in the write database 72. Generally, there may be some overlap between the contents of the write database 72 and the contents of the remote storage system 26, i.e., writes can be maintained in the write database 72 after being forwarded to the remote storage system 26. It may be desirable to keep any such overlap to a minimum in the interest of making efficient use of the storage resources dedicated to the write database 72. Alternatively, it may be desirable to maintain some number of writes in the write database 72 after the writes are applied to the remote storage system 26 in order to permit a later roll-back of the remote storage system 26 if necessary. In the example of FIG. 5, this might mean, for example, that the remote storage system 26 at the time NOW might be storing writes WK through WN+K, where K is some fraction of N. Generally, the relationship between the contents of the write database 72 and the remote storage system 26 may be managed in a variety of ways in furtherance of operational objectives of particular systems.

Figure 6:
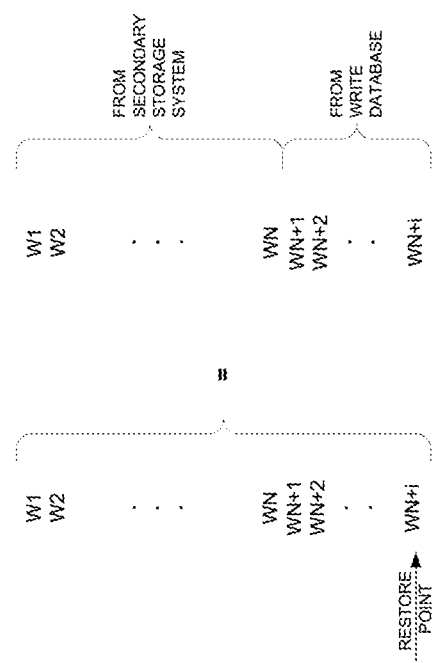
FIG. 6 is a schematic illustration showing restoration of contents of a primary volume at a particular point in time according to an embodiment of the system described herein.

FIG. 6 illustrates one way to achieve recovery to a particular point in time shown as a "restore point", in this case a point in time at which write WN+i has just completed. As shown, a restored state of the system may be created by applying the writes WN+1, WN+2, . . . , WN+i from the write database 72 to the contents of the remote storage system 26 (which reflect writes W1, W2, . . . , WN as shown). Applying the writes WN+1, WN+2, . . . , WN+i can be seen as a "roll back" from a current system state at the time of the write WM to a previous system state at a time of the write WN+i. It will be appreciated that it is possible to roll back to any point in time between WN and WM−1 with extremely fine-grained precision—the separation between each individual write W that is maintained within the write database 72. This ability for such precise roll-back provides essentially "continuous" data protection, i.e., protection for each data modification (write) along a continuum of modifications. Note that it is also possible to selectively roll-back and roll forward data so that, if improper I/O operations are detected, those I/O operations may be eliminated from any roll forward or the system may be rolled back to a time before the improper I/O operations. Improper I/O operations may include operations that cause malicious corruption or destruction of data or operations that inadvertently cause data corruption.

It is also possible to roll back the storage system 24, which may be preferable in instances where the restore point is closer to NOW than to the time corresponding to write WN, is to undo the writes WM, WM−1, . . . , WN+i. When a given write is undone, the data location is replaced with previous contents of the location, which may be contained in some yet earlier write in the write database 72. If necessary, the previous contents may be obtained from the remote storage system 26 or some other separately stored data pre-image. In some embodiments, the write database 72' may be coupled to the host 22', in which case the host 22', instead of the remote storage system 26, handles maintaining data in the write database 72' and performing writes from the write database 72' on to the remote storage system 26. Similarly, the write database 72" may be implemented using a logical storage device that is internal to the remote storage system 26. The data for the write database 72" may be maintained separately from other data of the remote storage system 26, but otherwise processed as described elsewhere herein.

Figure 7:
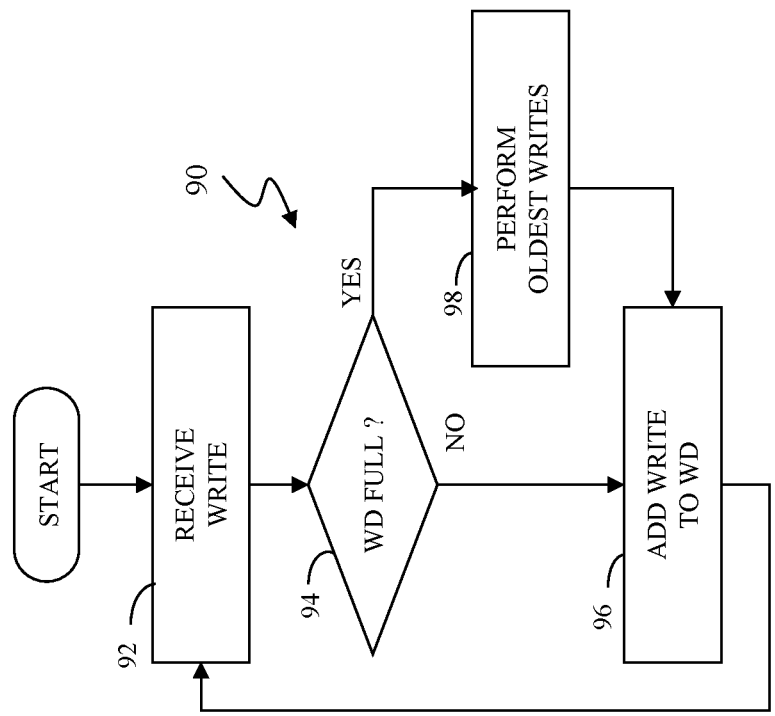
FIG. 7 is a flow diagram illustrating handling data provided to a remote storage system according to an embodiment of the system described herein.

Referring to FIG. 7, a flow diagram 90 illustrates processing performed by the remote storage system 26 in connection with receiving data transferred from the storage system 24. Processing begins at a first step 92 where the write is received from the storage system 24. Following the step 92 is a test step 94 where it is determined if the write database 72 is full. If not, then control transfers from the test step 94 to a step 96 where the write is added to the write database 72, as described elsewhere herein. Following the step 96, control transfers back to the step 92 for another iteration. If it is determined at the test step 94 that the write database 72 is full, then control transfers from the test step 94 to a step 98 where the oldest writes in the write database are performed (played) by writing the data to the remote storage system 26, as described in more detail elsewhere herein. Following the step 98 is the step 96, discussed above, where the data received from the storage system 24 is written to the write database 72.

Figure 8:
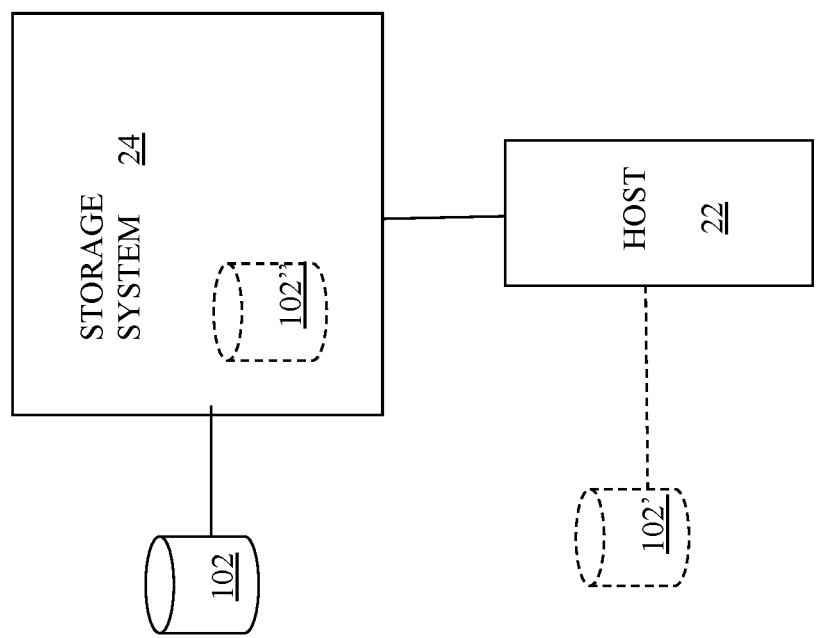
FIG. 8 is a schematic illustration showing a host, a storage system, and a write database maintained at the storage system according to an embodiment of the system described herein.

FIG. 8 shows an alternative system where the host 22 and the storage device 24 maintain a write database 102 like the write database 72, described above. The system may also use a write database 102' like the write database 72' or a write database 102" like the write database 72". Thus, one or more of the write databases 102, 102', 102" may be physically co-located with the storage system. Processing is similar to that described in connection with FIG. 4, except that the data that is provided to the write database 102 is data that is written by the host 12 rather than data that is received by the remote storage system 26 from the storage system 24. Note also that, in certain mainframe computer systems, for example, it is possible to create entirely distinct instances of the operating system using "logical partitions" or LPARs. Thus, the processing for handling the write database 102 (or the write database 102' or the write database 102") could be performed by an LPAR that is separate from an LPAR in which the application(s) that otherwise access the storage system 24, such as a database application for example.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of providing continuous data protection in a data storage system, comprising:

maintaining a database containing each data write made to a primary volume by a host during a recovery interval, the database being maintained in conjunction with a copying operation by which the data of the primary volume are mirrored to a remote volume to permit recovery of mirrored data in the event of loss of primary volume data, the contents of the remote volume corresponding to contents of the primary volume prior to a time of a particular data write in the database, wherein the data writes in the database include a time stamp mechanism of sufficient precision and granularity to cause dependent ones of the writes to maintain a proper order;

transferring oldest ones of the data writes from the database to the remote volume while adding more recent data writes to the database, wherein the oldest ones of the data writes are removed from the database and the remote volume is maintained at a remote volume time that is older than the oldest ones of the data writes remaining in the database;

selecting a restore point time corresponding to any time stamp of any of the data writes in the database, wherein the restore point time is earlier than a current point in time and later than the remote volume time; and restoring the remote volume to a state of the primary volume corresponding to the restore point time by applying, to the contents of the remote volume, only the data writes in the database that occurred between the time of the particular data write in the database and the restore point time.

2. A method according to claim 1, wherein the data modifications made to the primary volume are transferred to the database upon being written to a cache at a primary storage location containing the primary volume.

3. A method according to claim 1, wherein the copying operation is a remote copying operation.

4. A method according to claim 1, wherein the data of the primary volume is asynchronously mirrored to the remote volume located at a remote storage location.

5. A method, according to claim 1, wherein a recovery time is an amount of time needed to transfer all the data modifications in the database corresponding to the remote volume to create up-to-date remote storage volumes.

6. A method according to claim 1, wherein the recovery interval is no more than a predetermined maximum recovery time.

7. A method, according to claim 6, wherein the maximum recovery time is one hour.

8. A method according to claim 1, further comprising:

performing a complete recovery of the primary volume by transferring all the data modifications in the database to the remote volume location to create an up-to-date remote volume and copying the data from the up-to-date remote storage volume to the primary volume.

9. A method according to claim 1, wherein the copying operation is part of operation of a logical data migration facility operating within a host computer coupled to the primary and remote volumes, and wherein the data modifications are copied from the host computer to the remote volume.

10. A data storage system providing continuous data protection, comprising:
   a primary storage system at a primary storage location, the primary storage system including a primary volume receiving data modifications from a primary host computer system;
   a remote storage system at a remote storage location, the remote storage system including a remote volume; and
   a continuous data protection system that maintains a database containing each data write made to the primary volume by a host during a recovery interval, the database being maintained in conjunction with a remote copying operation by which the data of the primary volume are asynchronously mirrored to the remote volume to permit recovery of mirrored data in the event of loss of primary volume data, the contents of the remote volume corresponding to contents of the primary volume prior to a time of a particular data write in the database, wherein the data writes in the database include a time stamp mechanism of sufficient precision and granularity to cause dependent ones of the writes to maintain a proper order, the continuous data protection system transferring oldest ones of the data writes from the database to the remote volume while adding more recent data writes to the database and removing the oldest ones of the data writes from the database, wherein the remote volume is maintained at a remote volume time that is older than the oldest ones of the data writes remaining in the database, the continuous data protection system also providing selection of a restore point time corresponding to any time stamp of any of the data writes in the database, wherein the restore point time is earlier than a current point in time and later than the remote volume time, and the continuous data protection system restoring the remote volume to a state of the primary volume corresponding to the restore point time by applying, to the contents of the remote volume, only the data writes in the database that occurred between the time of the particular data write in the database and the restore point time.

11. A system according to claim 10, wherein the primary storage system includes a cache operative to receive and temporarily store the data modifications from the primary host computer system before the data modifications are written to the primary volume, and wherein the data modifications are transferred from the cache to the database upon being written to the cache.

12. A system according to claim 10, wherein the continuous data protection system is located in a primary host computer system at the primary storage location, the primary host computer system including an application program that utilizes the storage resources provided by the primary volume.

13. A system according to claim 12, wherein the primary host computer system is partitioned into at least two logical partitions (LPARs), one LPAR containing the continuous data protection system and the other LPAR containing the application program.

14. A system according to claim 10, wherein the continuous data protection system is further operative to perform a complete recovery of the primary volume by transferring all the data modifications in the database to the remote volume location to create an up-to-date remote volume and by copying the data from the up-to-date remote storage volume to the primary volume.

15. A computer program product comprising a computer-readable medium having computer instructions stored thereon, the computer instructions being operative when executed by a computer system to cause the computer system to execute a continuous data protection system to provide continuous data protection in a data storage system having a primary storage system and remote storage system, the continuous data protection system including the operations of:
   maintaining a database containing each data write made to a primary volume by a host during a recovery interval, the database being maintained in conjunction with a copying operation by which the data of the primary volume are mirrored to a remote volume to permit recovery of mirrored data in the event of loss of primary volume data, the contents of the remote volume corresponding to contents of the primary volume prior to a time of a particular data write in the database, wherein the data writes in the database include a time stamp mechanism of sufficient precision and granularity to cause dependent ones of the writes to maintain a proper order;
   transferring oldest ones of the data writes from the database to the remote volume while adding more recent data writes to the database, wherein the oldest ones of the data writes are removed from the database and the remote volume is maintained at a remote volume time that is older than the oldest ones of the data writes remaining in the database;
   selecting a restore point time corresponding to any time stamp of any of the data writes in the database, wherein the restore point time is earlier than a current point in time and later than the remote volume time; and
   restoring the remote volume to a state of the primary volume corresponding to the restore point time by applying, to the contents of the remote volume, only the data writes in the database that occurred between the time of the particular data write in the database and the restore point time.

16. A computer program product according to claim 15, wherein the data modifications made to the primary volume are transferred to the database upon being written to a cache at the primary storage location.

17. A computer program product according to claim 15, wherein the continuous data protection system further includes the operation of performing a complete recovery of the primary volume by transferring all the data modifications in the database to the remote volume location to create an up-to-date remote volume and copying the data from the up-to-date remote storage volume to the primary volume.

18. A method according to claim 1, wherein, if the restore time is before the time of the latest data modification to the remote volume, writes to the remote volume are undone by replacing previous contents of the remote volume using a stored data pre-image.

19. A system according to claim 10, wherein, if the restore time is before the time of the latest data modification to the remote volume, writes to the remote volume are undone by replacing previous contents of the remote volume using a stored data pre-image.

20. A computer program product according to claim 15, wherein, if the restore time is before the time of the latest data modification to the remote volume, writes to the remote volume are undone by replacing previous contents of the remote volume using a stored data pre-image.

* * * * *